3,836,572
DICARBAMOYL HYDROXAMATES
John E. Franz, Crestwood, Mo., assignor to Monsanto Company, St. Louis, Mo.
No Drawing. Filed Apr. 2, 1973, Ser. No. 347,114
Int. Cl. C07c 125/06
U.S. Cl. 260—472        13 Claims

ABSTRACT OF THE DISCLOSURE

The dicarbamoyl hydroxamates of this invention are pesticidally active and particularly useful as herbicides.

---

This invention relates to new and useful dicarbamoyl hydroxamates of the formula $$\begin{array}{c} H \quad O \\ | \quad \| \\ R'-N-C-O-C-R \\ \| \\ R'-N-C-O-N \\ | \quad \| \\ H \quad O \end{array}$$

wherein R is alkyl, aryl or aryloxymethyl and each R' is independently alkyl or aryl, preferably lower alkyl.

As employed herein, the term "alkyl" designates those groups wherein the aliphatic chain is straight or branched and has from 1 through 17 carbons, inclusive.

As employed herein, the term "aryl" designates phenyl groups of the formula $$-\!\!\!\left\langle\!\!\!\begin{array}{c}\phantom{x}\\\phantom{x}\end{array}\!\!\!\right\rangle\!\!-\!Z_n$$

wherein each Z is independently halo, trihalomethyl, cyano, nitro, lower alkyl or lower alkoxy, and $n$ is an integer from 0 through 3, inclusive, provided that when each Z is nitro, $n$ cannot exceed 2. Preferred Z groups are halo, nitro, trifluoromethyl and lower alkoxy. The term "halo" designates a halogen atom selected from fluorine, chlorine, bromine and iodine.

As employed herein, the terms "lower alkyl" and "lower alkoxy" designate those groups wherein the aliphatic chain is straight or branched and has from 1 through 5 carbons, inclusive.

As employed herein, the term "aryloxymethyl" designates groups of the formula $$-CH_2-O-\!\!\!\left\langle\!\!\!\begin{array}{c}\phantom{x}\\\phantom{x}\end{array}\!\!\!\right\rangle\!\!-\!Z_n$$

wherein Z and $n$ have the aforementioned significance.

The compounds of this invention are conveniently and efficiently prepared by the reaction, in an organic solvent, such as tetrahydrofuran, and in the presence of a trialkylamine, of about one molecular proportion of an hydroxamic acid of the formula $$\begin{array}{c} OH \\ | \\ R-C=N-OH \end{array}$$

and about 2 molecular proportions of an isocyanate of the formula $$R'-N=C=O$$

wherein R and R' have the aforementioned significance. When it is desired that the R' groups of the compound be different from each other, the reaction is conducted in two steps. The first step is the reaction, in an organic solvent and in the presence of a trialkylamine, between about equimolecular proportions of an hydroxamic acid and an isocyanate. The second step is the reaction, in an organic solvent and in the presence of a trialkylamine, between about equimolecular proportions of the product of the first step and a different isocyanate.

The amount of trialkyl amine present in the reaction mass is not critical. Usually the trialkylamine is present only in a catalytic amount. It is preferred not to use large quantities, i.e. more than one percent of the reaction mass, if maximum yield of product is desired. Preferred trialkyl amines have from 2 through 5 carbons in the alkyl group. A more preferred trialkyl amine is triethylamine.

The type of organic solvent is not critical so long as the reaction mass is maintained in solution. The reactants are either known compounds or may be prepared from known compounds by known methods.

The reaction is normally carried out at a temperature above the freezing point of the system but preferably not above its boiling point. More preferably, the reaction is carried out at temperatures of from about 0 degrees centrigrade (° C.), to about 60° C. The reaction is most conveniently carried out at about room temperature, about 23° C. The reaction is usually carried out at atmospheric pressure, but higher or lower pressures may be utilized if equipment and other factors favor such higher or lower pressures. The reaction may be carried out in an open vessel as well as under reflux.

The compounds of this invention are useful as biocides. Exemplary of such biocidal uses for these products is the control of nematodes, arachnids, arthropods and insects as well as eradication of noxious weeds. These compounds are particularly useful as herbicides.

Herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any aplication.

As illustrative of this invention, but not limitative thereof, is the following:

EXAMPLE 1

To a suitable reaction vessel is charged approximately 20 milliliters (ml.) of dry tetrahydrofuran. Approximately 1.46 grams (g.), about 0.005 moles, of 2,4,5-trichlorophenoxyacetohydroxamic acid is dissolved in the tetrahydrofuran. Approximately 0.3 g., about 0.005 moles, of methyl isocyanate and one drop of triethyl amine are added. The mass is allowed to stand for about 6 days at ambient room temperature, about 23° C. Thereafter the tetrahydrofuran is removed by warming under vacum leaving a residue of about 1.7 g. The residue is redissolved in approximately 25 ml. of dry tetrahydrofuran with slight warming. Approximately 0.25 g. of methyl isocyanate is added. The mass is allowed to cool to ambient room temperature for an additional 7 days. Thereafter, the tetrahydrofuran is removed by distillation leaving a white powder residue. The residue is dissolved in about 60 ml. of hot ethyl acetate. Upon cooling in ice, white crystals slowly form. After separation by filtration, the white crystals are found to be soluble in dimethyl formamide and tetrahydrofuran, to be insoluble in water, ether, benzene and heptane, and to have a melting point of about 179 to 180° C. with decomposition and is identified by nuclear magnetic resonance as 2,4,5-trichlorophenoxyacetohydroxamic acid diester with di-(methylcarbamic acid)

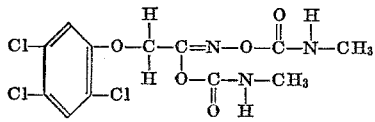

Calculated for $C_{12}H_{12}Cl_3N_3O_5$: C, 37.47; H, 3.14; Cl, 27.66; N, 10.93. Found: C, 37.82; H, 2.97; Cl, 27.73; N, 10.81.

EXAMPLE 2

To a suitable reaction vessel is charged about 25 ml. of dry tetrahydrofuran. Approximately 1.18 g., about 0.005 moles, of 2,4-dichlorophenoxyacetohydroxamic acid is dissolved in the tetrahydrofuran at room temperature. Approximately 0.3 g., about 0.005 moles, of methyl isocyanate is then added with swirling. The mass is allowed to stand for about two days at ambient room temperature. The tetrahydrofuran is then removed by heating under reduced pressure leaving a white powdery residue of about 0.95 g. The residue is dissolved in approximately 13 ml. of tetrahydrofuran. Approximately 0.15 g., of methyl isocyanate is added. The mass is allowed to stand at ambient room temperature for about fourteen days. Approximately 0.25 g. of methyl isocyanate are added with swirling. The mass is then allowed to stand overnight at ambient room temperature. Thereafter the tetrahydrofuran is removed by distillation under reduced pressure leaving a white powdery residue. The residue is washed twice and dissolved in hot ethyl acetate ether and, upon cooling, a white solid crystallizes out of the solution. The solid is separated from the liquid by filtration, is found to be soluble in ethanol and dimethyl formamide, to be insoluble in water, ether and benzene and to have a melting point of about 161 to 162° C. and is identified by nuclear magnetic resonance as 2,4-dichlorophenoxyacetohydroxamic acid diester with di-(methylcarbamic acid)

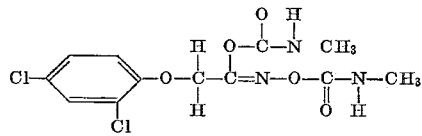

Calculated for $C_{12}H_{13}Cl_2N_3O_5$: C, 41.16; H, 3.74; Cl, 20.25; N, 12.00. Found: C, 41.00; H, 3.64; Cl, 20.44; N, 11.88.

EXAMPLE 3

To a suitable reaction vessel is charged about 25 ml. of dry tetrahydrofuran. Approximately 1.0 g., about 0.003 moles, of stearohydroxamic acid is dissolved in the dry tetrahydrofuran. Approximately 0.4 g., about 0.007 moles, of methyl isocyanate and one drop of triethyl amine are then added. The mass is allowed to stand for 21 days at ambient room temperature. A white precipitate is noted. After cooling in ice, about 0.65 g. of a dense white powder is removed by filtration. Upon washing with hot ethyl acetate and cooling, additional precipitate in the amount of about 0.35 g. is obtained by filtration. The tetrahydrofuran is then removed from one remaining filtrate by distillation leaving a white powdery residue. The residues are dissolved in about 30 ml. of hot ethyl acetate and, upon cooling, a white powder crystallizes out of the solution. The white powder is separated from the liquid by filtration and is recrystallized again. The recrystallized white powder is found to be soluble in dimethyl formamide and chloroform, to be insoluble in water, benzene, ether and heptane, and to have a melting point of about 112° C. with decomposition and is identified by nuclear magnetic resonance as stearohydroxamic acid diester with di(methylcarbamic acid)

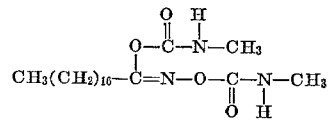

Calculated for $H_{22}H_{43}N_3O_4$: C, 63.89; H, 10.48; N, 10.16. Found: C, 63.72; H, 10.56; N, 9.96.

EXAMPLE 4

To a suitable reaction vessel is charged about 25 ml. of dry tetrahydrofuran. Approximately 1.71 g., about 0.0063 moles, of palmitohydroxamic acid is dissolved with heating in the tetrahydrofuran. Approximately 0.37 g., about 0.066 moles, of methyl isocyanate and 1 drop of triethyl amine as catalyst are then added. The mass is allowed to stand for about two hours at ambient room temperature. A white crystalline precipitate appears and is removed by filtration. The tetrahydrofuran is then removed from the filtrate by distillation leaving a tacky ivory residue. The residue is dissolved by heating in about 25 ml. of ethyl acetate and, upon slowly cooling, a white solid crystallizes out of the solution. The white solid is separated from the liquid by centrifugation. The process is repeated to obtain a total of about 1.5 g. of the white solid which is then dissolved in about 25 ml. of dry tetrahydrofuran with warming and approximately 0.3 g. of methyl isocyanate and a drop of triethylamine. The mass is then allowed to stand overnight at ambient room temperature. Thereafter the tetrahydrofuran is removed by distillation leaving an ivory powder. The ivory powder is dissolved in boiling diethyl ether, filtered hot, reheated to boiling and, upon cooling in ice, a white powder crystallizes out of solution. The white powder is separated from the solution by filtration and recrystallized to a constant melting point of about 106 to 108° C. with decomposition. The powder is dried at 80° C. and 0.3 mm. of Hg pressure for about two hours, and found to be soluble in ethanol, dimethyl formamide, tetrahydrofuran, chloroform and acetone, to be insoluble in water, heptane and benzene and to have a melting point of about 105 to 107° C. with decomposition and is identified by nuclear magnetic resonance as palmitohydroxamic acid diester with di(methylcarbamic acid)

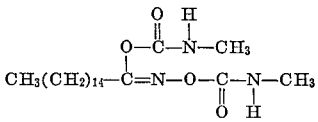

Calculated for $C_{20}H_{39}N_3O_4$: C, 62.32; H, 10.2; N, 10.9. Found: C, 62.57; H, 10.05; N, 10.77.

EXAMPLE 5

To a suitable reaction vessel is charged about 20 ml. of dry tetrahydrofuran. Approximately 1.31 g., about 0.01 moles, of hexanohydroxamic acid is dissolved in the dry tetrahydrofuran. Approximately 1.2 g., about .021 moles, of methyl isocyanate and a drop of triethylamine are then added. The mass is allowed to stand for about two days at ambient room temperature. The tetrahydrofuran is then removed by distillation leaving a yellow oily residue which solidifies to ivory powder on standing and scratching. The powder is pulverized and extracted twice with diethyl ether, each time cooling in ice before filtering. The white powder is found to be soluble in ethanol, dimethyl formamide and chloroform, to be insoluble in water, ether, benzene and heptane and to have a melting point of about 94 to 96° C. with decomposition and is identified by nuclear magnetic resonance as hexanohydroxamic acid diester with di(methylcarbamic acid)

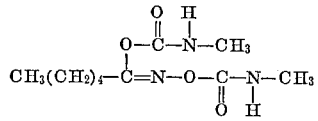

Calculated for $C_{10}H_{19}N_3O_4$: C, 48.97; H, 7.81; N, 17.13. Found: C, 48.99; H, 7.79; N, 17.18.

EXAMPLE 6

To a suitable reaction vessel is charged about 25 ml. of tetrahydrofuran. Approximately 1.37 g., about 0.01 moles, of benzohydroxamic acid is dissolved in the tetrahydrofuran by warming. Approximately 1.2 g., about 0.021 moles, of methyl isocyanate and one drop of triethyl amine are added. The mass is swirled and allowed to stand for about five days at ambient room temperature. To the mass is added diethyl ether. A white crystalline solid precipitates and is recovered by filtration and washed with diethyl ether. Upon recrystallization in boiling benzene, the white crystals are found to be soluble in acetone, chloroform, ethanol and dimethyl formamide and insoluble in water and heptane, to have a melting point of about 139 to 140° C. with decomposition and identified by nuclear magnetic resonance as benzohydroxamic acid diester with di(methylcarbamic acid)

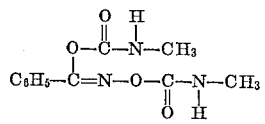

Calculated for $C_{11}H_{13}N_3O_4$: C, 52.59; H, 5.22; N, 16.73. Found: C, 52.65; H, 5.32; N, 16.56.

EXAMPLE 7

To a suitable reaction vessel is charged about 20 ml. of dry tetrahydrofuran. Approximately 1.17 g., about 0.01 moles, of valerohydroxamic acid is readily dissolved in the tetrahydrofuran. Approximately 1.2 g., about 0.021 moles, of methyl isocyanate and one drop of trithylamine are added. The mass is allowed to stand for about five days at ambient room temperature. An additional 0.1 g. of methyl isocyanate and a second drop of triethylamine is added. The mass is allowed to stand overnight at ambient room temperature. The solvent is removed by distillation leaving a yellow viscous oil. Upon cooling in ice and scratching, an ivory waxy material forms. The wax is extracted with ice cold diethyl ether. The extracted wax and ether are separated by filtration. Petroleum ether is added to the filtrate causing a precipitate to form. The precipitate is recovered by filtration and combined with the extracted wax. The combined materials are recrystallized from boiling petroleum ether. The white crystals are found to be soluble in diethyl ether, acetone, chloroform, ethanol and dimethyl formamides, insoluble in water, benzene and heptane, to have a melting point of about 69 to 71° C. with decomposition and identified by nuclear magnetic resonance as valerohydroxamic acid diester with di(methylcarbamic acid)

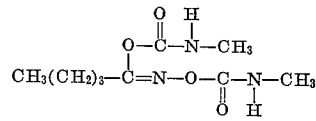

Calculated for $C_9H_{17}N_3O_4$: C, 46.74; H, 7.41; N, 18.17. Found: C, 47.00; H, 7.60; N, 18.25.

EXAMPLE 8

To a suitable reaction vessel is charged about 25 ml. of dry tetrahydrofuran. Approximately 1.59 g., about 0.01 moles, of octanohydroxamic acid is dissolved in the tetrahydrofuran. Approximately 1.2 g., about 0.02 moles, of methyl isocyanate and one drop of triethylamine are then added. After about 2 hours at ambient room temperature, approximately 0.1 g. of methyl isocyanate is added and the mass is permitted to stand for about 3 days at ambient room temperature. After centrifuging the solvent is removed by distillation leaving a waxy ivory solid. The solid is extracted with cold diethyl ether. The ether is cooled in ice and filtered to recover a white powder precipitate. Petroleum ether is added to the filtered solution. The ether mixture is cooled in ice and the precipitate which forms is separated from the ether mixture by filtration. Upon recrystallization of the combined precipitates from boiling diethyl ether and drying, the white powder is found to be soluble in acetone, chloroform, ethanol and dimethyl formamide and insoluble in benzene and heptane, to have a melting point of about 86 to 87.5° C. with decomposition and is identified by nuclear magnetic resonance as octanohydroxamic acid diester with di(methylcarbamic acid)

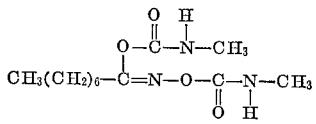

Calculated for $C_{12}H_{23}N_3O_4$: C, 52.73; H, 8.48; N, 15.37. Found: C, 52.79; H, 8.53; N, 15.40.

EXAMPLE 9

To a suitable reaction vessel is charged about 25 ml. of tetrahydrofuran. Approximately 1.87 g., about 0.01 moles, of decanohydroxamic acid are dissolved in the tetrahydrofuran with warming. Approximately 1.25 g., about 0.02 moles, of methyl isocyanate and a drop of triethylamine are added. An additional 0.15 g. of methyl isocyanate is then charged to the mass after about an hour. The mass is then allowed to stand overnight at ambient room temperature. The solvent is removed by distillation leaving a white powder residue. The powder is pulverized and extracted with diethyl ether. The ether and powder mixture is cooled in ice and filtered. The recovered powder is dissolved in 50 ml. of warm diethyl ether. The solution is cooled in ice and the precipitate which forms is separated from the ether by filtration with suction. Upon recrystallization twice in this same manner, the dense white powder is found to be soluble in acetone, chloroform, ethanol, ethyl acetate and dimethyl formamide and insoluble benzene and heptane, to have a melting point of about 94.5 to 96° C. with decomposition and is identified by nuclear magnetic resonance as decanohydroxamic acid diester with di(methylcarbamic acid)

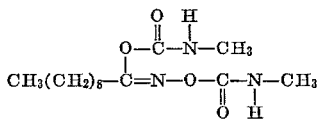

Calculated for $C_{14}H_{27}N_3O_4$: C, 55.79; H, 9.03; N, 13.94. Found: C, 56.05; H, 8.90; N, 13.81.

EXAMPLE 10

To a suitable reaction vessel is charged approximately 25 ml. of dry, warm tetrahydrofuran. Approximately 1 g., about 0.0137 moles, of acetohydroxamic acid is dissolved in the tetrahydrofuran. A drop of triethylamine and approximately 1.54 g., about 0.027 moles, of methyl isocyanate are added. The mass is then allowed to stand overnight at ambient room temperature. Thereafter the tetrahydrofuran is removed by distillation leaving an off-white solid. The solid is pulverized, washed with 20 ml. of diethyl ether and allowed to stand at ambient room temperature for about one half hour. The ether is separated by filtration and the remaining solid is dissolved in boiling diethyl ether and, upon cooling in ice, a white solid crystallizes from the ether in needle-shaped crystals. The white crystals are found to be soluble in acetone, ethanol, chloroform and dimethyl formamide and insoluble in benzene and heptane, to have a melting point of 121 to 122° C. with decomposition and are identified by chemical analysis as acetohydroxamic acid diester with di(methylcarbamic acid)

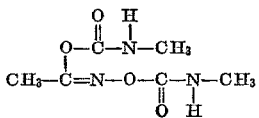

Calculated for $C_6H_{11}N_3O_4$: C, 38.09, H, 5.86; N, 22.21. Found: C, 38.21; H, 5.77; N, 22.03.

In a similar manner by dissolving one molecular proportion of the appropriate hydroxamic acid in dry tetrahydrofuran, adding the appropriate isocyanate in an amount in excess of two molecular proportions in the presence of a catalytic amount of triethylamine, and then separating the resultant product by conventional meanas, the following hydroxamic acid diesters are obtained:

Example:

11 Isibutyrohydroxamic acid diester with di(phenylcarbamic acid)
12 Para-trifluoromethylphenoxyacetohydroxamic acid diester with di(ethylcarbamic acid)
13 Meta-nitrophenoxyacetohydroxamic acid diester with di(amylcarbamic acid)
14 Phenoxyacetohydroxamic acid diester with di(isopropylcarbamic acid)
15 Para-methoxyphenoxyacetohydroxamic acid diester with di(propylcarbamic acid)
16 2,6-diethylphenoxyacetohydroxamic acid diester with di(butylcarbamic acid)
17 Ortho-bromophenoxyacetohydroxamic acid diester with di(tert-butylcarbamic acid)
18 Meta-cyanophenoxyacetohydroxamic acid diester with di(meta-propylphenylcarbamic acid)
19 3-ethoxy-5-butylphenoxyacetohydroxamic acid
20 3,4-difluorophenoxyacetohydroxamic acid diester with di(para-chlorophenylcarbamic acid)
21 3,4,5-trichlorobenzohydroxamic acid diester with di(ortho-propoxyphenylcarbamic acid)
22 2,4-diethoxybenzohydroxamic acid diester with di(2,6-dichlorophenylcarbamic acid)
23 3,5-dinitrobenzohydroxamic acid diester with di(meta-trifluoromethylphenylcarbamic acid)
24 Meta-iodobenzohydroxamic acid diester with di(isobutylcarbamic acid)
25 Ortho-trichloromethylbenzohydroxamic acid diester with di(para-cyanophenylcarbamic acid)
26 Para-pentoxybenzohydroxamic acid diester with di(neopentylcarbamic acid)
27 2,4,5-trimethoxybenzohydroxamic acid diester with di(dodecylcarbamic acid)
28 2,4-ditrifluoromethylbenzohydroxamic acid diester with di(octylcarbamic acid)
29 2,4-dicyano-6-methylbenzohydroxamic acid diester with di(ethylcarbamic acid)
30 2,6-dibromobenzohydroxamic acid diester with di(heptadecylcarbamic acid)

Likewise, by dissolving an amount of an hydroxamic acid in dry tetrahydrofuran, adding an equimolecular proportion of an isocyanate in the presence of a catalytic amount of a tertiary amine, and, after the reaction is complete, adding an equimolecular proportion of a second isocyanate in the presence of a tertiary amine catalyst, the following hydroxamic acid mixed esters are obtained (the first named carbamic acid is attached to the nitrogen of the hydroxamic acid):

Example:

31 Propionohydroxamic acid mixed ester with methylcarbamic acid and ethylcarbamic acid
32 Phenoxyacetohydroxamic acid mixed ester with methylcarbamic acid and phenylcarbamic acid
33 Benzohydroxamic acid mixed ester with ethylcarbamic acid and iso-propylcarbamic acid
34 Acetohydroxamic acid mixed ester with amylcarbamic acid and methylcarbamic acid
35 Heptanohydroxamic acid mixed ester with tert. butylcarbamic acid and propylcarbamic acid
36 Meta-bromobenzohydroxamic acid mixed ester with phenylcarbamic acid and iso-butylcarbamic acid
37 Para-isobutoxybenzohydroxamic acid mixed ester with para-methoxyphenylcarbamic acid and ethylcarbamic acid
38 Meta-nitrophenoxyacetohydroxamic acid mixed ester with propylcarbamic acid and meta-nitrophenylcarbamic acid

EXAMPLE 39

Pre-emergent herbicidal activity of representative compounds of this invention is determined by the following procedure:

A good grade of top soil is placed in aluminum pans and compacted to a depth of ⅜ to ½ inch from the top of the pan. A predetermined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain the desired rate of application which is measured in terms of lbs. per acre. The pans are then placed on a sand bench in the greenhouse and watered from below as needed. The plants are observed at the end of approximately 14 days and the results recorded.

The pre-emergent phytotoxic activity of the active ingredients is measured by the average percent control of each seed lot. The average percent control is converted to a relative numerical scale for the sake of brevity and simplicity in the examples. The pre-emergent phytotoxic activity index, as used in Table I, is defined as follows:

| Average percent control: | Numerical scale |
|---|---|
| 0–25 | 0 |
| 26–50 | 1 |
| 51–75 | 2 |
| 76–100 | 3 |

The pre-emergent phytotoxic activity of some of the compounds of this invention are summarized in Table I. A dash (—) denotes that the species is not in the test.

TABLE I

| | Compound of Example No. | | | | | |
|---|---|---|---|---|---|---|
| | 1 | 2 | 4 | 5 | 8 | 10 |
| Rate of application (lbs./acre) | 1 | 1 | 5 | 5 | 5 | 5 |
| Plant species: | | | | | | |
| Canada thistle | | | | | | 3 |
| Cocklebur | | | | | | 1 |
| Velvetleaf | | | | | | 0 |
| Morning glory | 1 | 3 | 0 | 0 | 1 | 1 |
| Lambsquarters | | | | | | 2 |
| Smartweed | | | | | | 2 |
| Nutsedge | | | | | | 0 |
| Quackgrass | | | | | | 0 |
| Johnson grass | | | | | | 1 |
| Brome | 0 | 1 | 0 | 0 | 0 | 0 |
| Barnyard grass | | | | | | 0 |
| Wild oat | 0 | 0 | 0 | 0 | 0 | — |
| Rye grass | 0 | 1 | 0 | 0 | 0 | — |
| Wild buckwheat | 0 | 0 | 1 | 1 | 2 | — |
| Radish | 3 | 3 | 1 | 2 | 1 | — |
| Sugar beets | 3 | 3 | 3 | 1 | 0 | — |
| Foxtail | | | 0 | 0 | 0 | — |
| Crabgrass | 2 | 3 | 0 | 1 | 1 | — |
| Pigweed | 3 | 3 | 1 | 1 | 0 | — |
| Soybean | 1 | 2 | 0 | 0 | 0 | — |
| Tomato | 1 | 0 | 2 | 0 | 2 | — |
| Sorghum | 0 | 2 | 0 | 0 | 0 | — |

EXAMPLE 40

Contact herbicidal activity of representative compounds of this invention is determined by the following procedure:

The compound to be tested is applied in spray form to plants of a given age of several grasses and broadleaf species. After the plants are the desired age, each aluminum pan of plants is sprayed with a given volume of a solution of the desired percent concentration of the candidate chemical. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent of a tall oil-ethylene oxide condensate having about 6 moles of ethylene oxide per mole of tall oil. The injuries to the plants are then observed approximately 14 days later and the results are recorded. The herbicidal rating is obtained by means of a fixed scale based on the average percent germination of each seed lot. The herbicidal ratings are defined as follows:

| 0 | No phytotoxicity. |
|---|---|
| 1 | Slight phytotoxicity. |
| 2 | Moderate phytotoxicity. |
| 3 | Severe phytotoxicity. |
| 4 | Plants all dead. |
| — | Not tested. |

Individual injury ratings for each plant type are reported in Table II.

Herbicidal solution concentrations of 0.05 percent, and 0.5 percent are substantially equivalent to application rates of 1 pound per acre and 10 pounds per acre, respectively.

TABLE II

| | Compound of Example No. | | | | | |
|---|---|---|---|---|---|---|
| | 1 | 2 | 4 | 5 | 8 | 10 |
| Rate of application (percent) | 0.05 | 0.05 | 0.5 | 0.5 | 0.5 | 0.5 |
| Plant species: | | | | | | |
| Canada thistle | | | | | | 0 |
| Cocklebur | | | | | | 0 |
| Velvetleaf | | | | | | 0 |
| Morning glory | 3 | 3 | 1 | 1 | 0 | 1 |
| Lambsquarters | | | | | | 1 |
| Nutsedge | | | | | | 0 |
| Smartweed | | | | | | 0 |
| Quackgrass | | | | | | 0 |
| Johnson grass | | | | | | 0 |
| Brome | 0 | 0 | 0 | 0 | 0 | 0 |
| Barnyard grass | | | | | | 0 |
| Wild oat | 0 | 0 | 0 | 0 | 0 | — |
| Rye grass | 0 | 0 | 0 | 1 | 0 | — |
| Wild buckwheat | 4 | 3 | 2 | 1 | 0 | — |
| Radish | 3 | 3 | 1 | 1 | 0 | — |
| Sugar beets | 3 | 3 | 1 | 1 | 0 | — |
| Foxtail | | | 0 | 1 | 0 | — |
| Crabgrass | 1 | 1 | 0 | 0 | 0 | — |
| Pigweed | 3 | 4 | 0 | 1 | 2 | — |
| Soybean | 2 | 2 | 1 | 1 | 0 | — |
| Tomato | 3 | 3 | 1 | 1 | 0 | — |
| Sorghum | 0 | 0 | 0 | 1 | 0 | — |

In terms of enzymatic inhibition, it is known that the commercial carbamate and organophosphate insecticides serve to inhibit cholinesterase activity. Compounds of this invention are tested for this purpose in the following manner.

EXAMPLE 4

Approximately 2000 houseflies are homogenized in 300 mls. of cold distilled water. The homogenate is filtered through two layers of cheesecloth to remove large debris. The filtered homogenate is next centrifuged for 10 minutes at $12,000 \times g$. The pellet is discarded and the supernatant is again filtered through two layers of cheesecloth and centrifuged for 60 minutes at $105,000 \times g$. Following centrifuging the supernatant is poured off and discarded. The resultant pellet (microsomal fraction) is resuspended in a minimum volume of cold distilled water and frozen at $-10°$ C. for no longer than six weeks. Prior to use the frozen microsomal fraction is thawed and made up to 150 mls. with cold distilled water. The microsomes are then sonicated with a Bronson sonicator for 30 seconds to disperse the microsomes. Approximately 75% of the original cholinesterase actively present in the whole homogenate is recorded in the microsomal fraction.

Measurements of the inhibition of housefly cholinesterase are made on a Technicon Auto Analyzer essentially as described by G. D. Winter, Ann., N.Y. Acad. Sci., Vol. 87, pp. 875–882 (1960). Inhibition of housefly cholinesterase to the extent shown in the table below is found using representative compounds of this invention at the concentrations specified. A dash (—) denotes no test at the specified concentration. Figures opposite the example number denote percent inhibition.

| | Concentration (p.p.m.) | | | | | |
|---|---|---|---|---|---|---|
| | 20 | 10 | 2 | 1 | 0.2 | 0.1 |
| Compound of Example No.: | | | | | | |
| 3 | | | 20 | | | |
| 4 | | 30 | 20 | | | |
| 5 | | | 90 | | 50 | 10 |
| 6 | | | | 90 | 80 | 20 |
| 7 | | | 90 | | 60 | 20 |
| 8 | | 90 | | | 40 | 0 |
| 9 | | 80 | 60 | | 10 | |
| 10 | | | | | 80 | 30 | 20 |

While this invention has been described with respect to certain embodiments, it is to be understood that it is not so limited and that variations and modifications thereof obvious to those skilled in the art to which this invention appertains can be made without departing from the spirit or scope thereof.

What is claimed is:
1. A compound of the formula

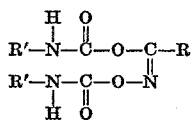

wherein R is alkyl of from 1 through 17 carbons, inclusive, aryl of the formula

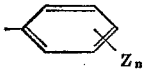

wherein each Z is independently halo, trihalomethyl, cyano, nitro, lower alkyl or lower alkoxy, and $n$ is an integer of 0 through 3, inclusive, provided that when each Z is nitro, $n$ cannot exceed 2, or aryloxymethyl of the formula

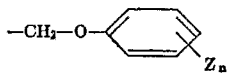

wherein Z and $n$ have the aforementioned significance and each R' is independently alkyl of from 1 through 17 carbons, inclusive, or aryl of the formula

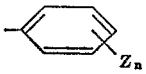

wherein Z and $n$ have the aforementioned significance.

2. A compound of Claim 1 wherein R is alkyl.
3. A compound of Claim 1 wherein R is aryl.
4. A compound of Claim 1 wherein R is aryloxymethyl.
5. A compound of Claim 4 wherein each R' is aryl.
6. A compound of Claim 4 wherein each R' is lower alkyl.
7. A compound of Claim 6 wherein each R' is methyl.
8. The compound of Claim 7 wherein R is 2,4-dichlorophenoxymethyl.
9. The compound of Claim 7 wherein R is 2,4,5-trichlorophenoxymethyl.
10. A compound of Claim 1 wherein one R' is aryl and the other R' is alkyl.
11. A compound of Claim 1 wherein each R' is the same lower alkyl.
12. A compound of Claim 11 wherein each R' is methyl.
13. A compound of Claim 11 wherein R is aryl.

References Cited
UNITED STATES PATENTS
3,415,869   12/1968   Wilkinson et al. _____ 260—472

LORRAINE A. WEINBERGER, Primary Examiner

L. A. THAXTON, Assistant Examiner

U.S. Cl. X.R.

71—105, 106, 111; 260—465 D, 482 B; 424—300